United States Patent
Bauman et al.

(10) Patent No.: US 8,269,641 B2
(45) Date of Patent: Sep. 18, 2012

(54) VEHICLE POWER MANAGEMENT SYSTEM

(75) Inventors: Jason G. Bauman, Birmingham, MI (US); Thomas M. O'Brien, Troy, MI (US)

(73) Assignee: Lear Corporation, Southfield, MI (US)

(*) Notice: Subject to any disclaimer, the term of this patent is extended or adjusted under 35 U.S.C. 154(b) by 289 days.

(21) Appl. No.: 12/795,189

(22) Filed: Jun. 7, 2010

(65) Prior Publication Data

US 2011/0298624 A1    Dec. 8, 2011

(51) Int. Cl.
*G08B 21/00* (2006.01)

(52) U.S. Cl. .......... 340/636.1; 340/636.2; 340/455; 320/109; 320/132; 320/134; 180/65.29

(58) Field of Classification Search .......... 340/636.1, 340/636.2, 455, 636.12, 636.21, 438, 573.1; 600/365; 320/109, 132, 134, 101, 110, 111, 320/128, 136, 139, 148, 150, 156, 160–163; 324/426, 429; 307/10.1, 12; 180/65.29
See application file for complete search history.

(56) References Cited

U.S. PATENT DOCUMENTS

| | | | |
|---|---|---|---|
| 4,639,609 A | 1/1987 | Floyd et al. | |
| 5,168,205 A | 12/1992 | Kan et al. | |
| 5,861,730 A * | 1/1999 | Lee | 320/106 |
| 5,864,220 A | 1/1999 | Reipur et al. | |
| 6,075,339 A | 6/2000 | Reipur et al. | |
| 6,208,931 B1 | 3/2001 | Schoettle et al. | |
| 6,331,762 B1 | 12/2001 | Bertness | |
| 6,456,042 B1 | 9/2002 | Kwok | |
| 6,828,914 B2 * | 12/2004 | Zur et al. | 340/636.1 |
| 6,876,174 B1 | 4/2005 | Samittier marti et al. | |
| 6,928,381 B2 | 8/2005 | Becker-Irvin et al. | |
| 6,982,540 B2 | 1/2006 | Richter et al. | |
| 7,057,376 B2 | 6/2006 | Cook et al. | |
| 7,164,272 B1 | 1/2007 | Borrego Bel et al. | |
| 7,173,347 B2 | 2/2007 | Tani et al. | |
| 7,421,323 B2 | 9/2008 | Dannenberg et al. | |
| 7,459,801 B2 | 12/2008 | Shimoyama et al. | |
| 7,615,965 B2 | 11/2009 | Popescu-Stanesti et al. | |
| 7,688,022 B2 | 3/2010 | Alvarez-Troncoso et al. | |
| 7,728,555 B2 * | 6/2010 | Seo et al. | 320/132 |
| 8,063,757 B2 * | 11/2011 | Frey et al. | 340/455 |
| 2004/0232769 A1 | 11/2004 | Pickering | |
| 2005/0285445 A1 | 12/2005 | Wruck et al. | |

* cited by examiner

*Primary Examiner* — Anh V La

(74) *Attorney, Agent, or Firm* — MacMillan, Sobanski & Todd, LLC.

(57) ABSTRACT

A vehicle power management system (VPMS) controls a charging voltage of a battery in a vehicle, wherein a VPMS controller evaluates state-of-charge (SOC), battery temperature, and battery charging current to determine a charge mode. A rapid charge mode is used when the SOC is less than a first threshold, wherein the VPMS controller selects a target rapid charge voltage, compensates the target rapid charge voltage for the battery temperature, and transmits the compensated rapid charge voltage to the charging source. A normal charge mode is used when the SOC is greater than the first threshold and less than a second threshold, wherein a target normal charge voltage is selected and compensated which is less than the target rapid charge voltage. A trickle charge mode is used when the SOC is greater than the second threshold, wherein a target trickle charge voltage is less than the target normal charge voltage. The VPMS controller also enters the trickle charge mode in the event of a failure to receive the SOC, battery temperature, or battery charging current from a battery monitor.

16 Claims, 3 Drawing Sheets

VEHICLE POWER MANAGEMENT SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to vehicle power management system, and, more specifically, to controlling a recharging voltage applied to a battery from a charging source in a vehicle.

Complex controls have been and will continue to be developed for managing electrical power in motor vehicles. The manner in which a battery in such a system is recharged impacts several important aspects of vehicle performance, including battery life and capacity, fuel economy, and proper operation of electrical accessories. Vehicle manufacturers have devoted significant efforts to optimize one or more performance aspects, resulting in complex systems that dynamically control battery charging based on a large number of sensed conditions during vehicle operation. Efforts to develop these complex systems are time consuming and costly. Likewise, the resulting systems require significant data processing capacities. The extensive data gathering and processing hardware is relatively expensive to produce and install.

Another disadvantage of complex systems is that they are not easily reusable on different vehicle models without extensive modification. Since any particular vehicle model includes unique combinations of electrical components and systems, a separate effort has been required to design and validate a vehicle power management system for each respective vehicle. A simple, effective recharging methodology based on a limited number of input conditions would be desirable in order to provide an off the shelf system that is easily adapted to and validated for any particular vehicle model.

SUMMARY OF THE INVENTION

In one aspect of the invention, a vehicle power management system (VPMS) is provided for controlling a charging voltage of a battery in a vehicle, wherein the vehicle includes a charging source that provides a selected voltage to the battery. A battery monitor is coupled to the battery for determining a state of charge (SOC) of the battery, a battery temperature, and a battery charging current. A VPMS controller receives periodic messages from the battery monitor including measurement results of the SOC, battery temperature, and battery charging current from the battery monitor, wherein the VPMS controller evaluates the messages from the battery monitor to determine a charge mode.

The VPMS controller enters a rapid charge mode when the SOC is less than a first threshold. In the rapid charge mode the VPMS controller selects a target rapid charge voltage, compensates the target rapid charge voltage for the battery temperature, and transmits the compensated rapid charge voltage to the charging source. Also in the rapid charge mode, the VPMS controller compares the battery charging current to an overcurrent threshold and if the battery charging current exceeds the overcurrent threshold then the VPMS controller transmits a reduced charge voltage to the charging source.

The VPMS controller enters a normal charge mode when the SOC is greater than the first threshold and less than a second threshold. In the normal charge mode the VPMS controller selects a target normal charge voltage which is less than the target rapid charge voltage, compensates the target normal charge voltage for the battery temperature, and transmits the compensated normal charge voltage to the charging source.

The VPMS controller enters a trickle charge mode when the SOC is greater than the second threshold. In the trickle charge mode the VPMS controller selects a target trickle charge voltage which is less than the target normal charge voltage, compensates the target trickle charge voltage for the battery temperature, and transmits the compensated trickle charge voltage to the charging source. The VPMS controller also enters the trickle charge mode in the event of a failure to receive the SOC, battery temperature, or battery charging current from the battery monitor.

BRIEF DESCRIPTION OF THE DRAWINGS is FIG. 1 is a block diagram showing one embodiment of a vehicular electrical system employing the present invention.

DETAILED DESCRIPTION OF PREFERRED EMBODIMENTS

A main goal of the present invention is to determine a target charge voltage which is then communicated to a charging source for delivering a charging voltage and charging current to the battery. Many prior art algorithms for managing vehicle power have sought to charge the battery in a way that maximizes battery life and performance. The present invention may preferably set the target charge voltage in a way that instead maximizes fuel efficiency. Thus, the manor in which the target charge voltages are selected may allow for undercharging or overcharging the battery during certain conditions of vehicle operation. In order to ensure accurate charging control, battery status is classified according to three recharging modes each with a different predetermined target charge voltage. A selected target voltage is compensated for battery temperature and for known wire resistances. In addition to the selection of target charge voltage, the present invention may provide optional enhanced features including battery state of health notification, voltage range monitoring, and load shedding at a low battery state of charge.

Figure 1:
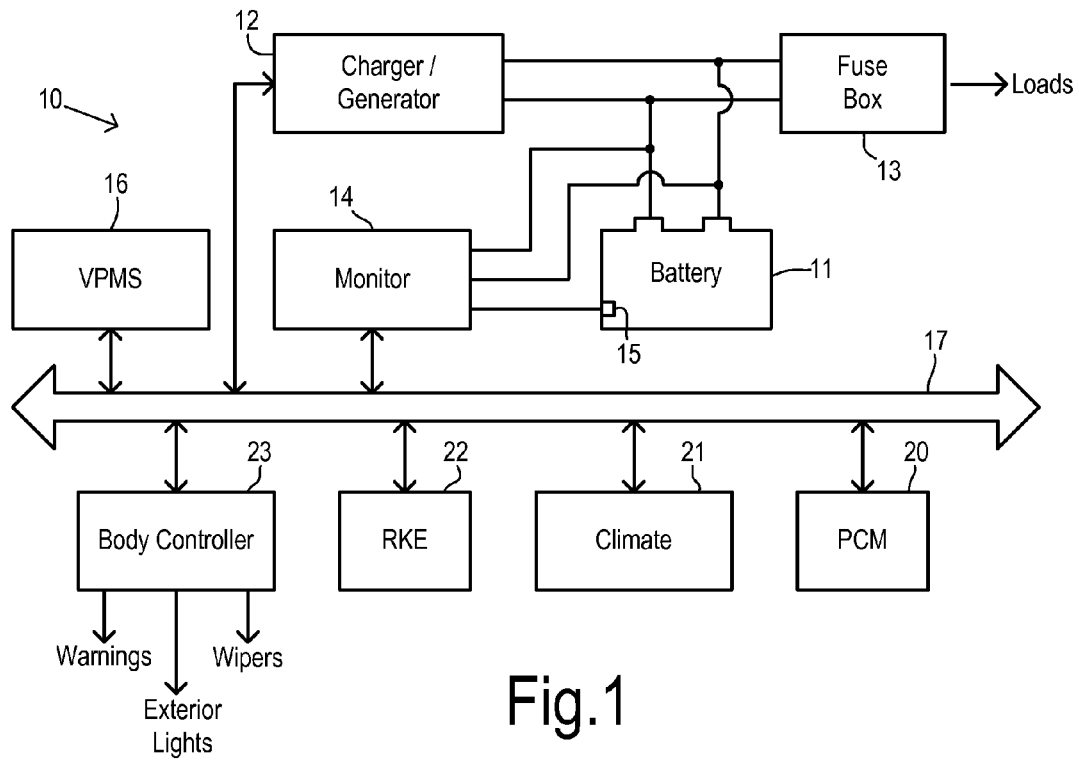

Referring now to FIG. 1, a vehicle electrical system 10 includes a battery 11 which may be a conventional low voltage battery (e.g., 14 volts), a conventional high voltage battery (e.g., 32 volts), or any other desired voltage. The electrical system may be incorporated into a vehicle with a conventional internal combustion engine or a hybrid (gas-electric) propulsion system.

A charger/generator system 12 is coupled to battery 11 wherein mechanical energy (e.g., from the internal combustion engine) is converted to a voltage desired to be applied to battery 11 as a recharging voltage. The output of battery 11 is also coupled to a fuse box 11 for supplying electrical energy to various loads in the vehicle. A monitor 14 is connected to the battery outputs and to a battery temperature sensor 15 located in proximity to battery 11.

A vehicle power management system (VPMS) controller 16 is coupled via a vehicle communication bus 17 (such as a CAN bus) to monitor 14 for receiving periodic messages from monitor 14 which include a state of charge (SOC) of battery 11, a battery temperature, and a battery charging current determined by monitor 14. VPMS controller 16 is also coupled to charger/generator 12 via bus 17 in order to transmit a target charge voltage to charger/generator 12. Charger/generator 12 may preferably be a regulated system including a DC/DC converter for providing any selected voltage to battery 11.

Other modules coupled to bus 17 include a powertrain control module (PCM) 20, a climate control module 21, a remote keyless entry (RKE) module 22, and a body controller module 23. VPMS controller 16 may send commands to modules 20-23 and/or receive data messages from modules 20-23 to implement optional features of the invention as described below.

Figure 2:
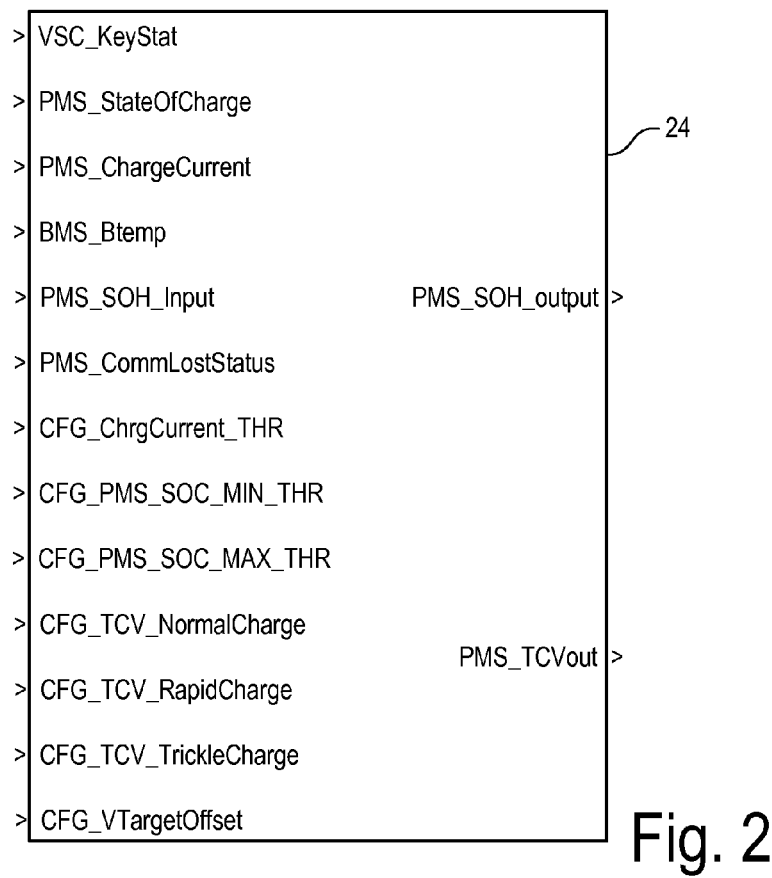
FIG. 2 is an input/output diagram of one embodiment of a VPMS controller.

FIG. 2 is an input/output diagram for a VPMS controller block 24. The variables used in the VPMS controller which may either be received in a message from another module or may be pre-stored or calculated in the VPMS controller are as follows. VSC_KeyStat has two possible values indicating that the vehicle ignition is in an off position or a run position. The VSC_KeyStat variable may be obtained from a vehicle system controller or other module. A variable named PMS_StateOfCharge corresponds to the actual state of charge of the battery. The state of charge (SOC) can be determined by the battery monitor module or by the VPMS controller based on various battery measurements received from the battery monitor module. The state of charge may be determined as shown in commonly assigned U.S. Pat. No. 6,876,174, for example.

A variable named PMS_ChargeCurrent corresponds to a measured charging current being delivered to the battery from the charging source as measured by the battery monitor, for example. BMS_Btemp is the battery temperature measured by the integral temperature sensor that is connected to the battery monitor.

PMS_SOH_Input corresponds to the state of health (SOH) of the battery, which may also be determined using techniques shown in U.S. Pat. No. 6,876,174.

A variable named PMS_CommLostStatus identifies whether bus communication between the VMPS controller and the battery monitor or other modules being used to supply relevant data to the VPMS controller becomes lost.

A variable named CFG_ChrgCurrent_THR is a configurable charge current threshold that is used to detect an excessive load on the charging source that may interfere with fuel efficiency. A variable CFG_PMS_SOC_MIN_THR is a configurable minimum state of charge threshold used by the VPMS controller together with a variable CFG_PMS_SOC_MAX_THR which is a maximum threshold to determine which of three ranges the current battery SOC falls in order to activate one of three charge modes used by the present invention.

A variable CFG_TCV_NormalCharge is a target charge voltage to be used in a normal charge mode. CFG_TCV_RapidCharge is a target charge voltage to be used in a rapid charge mode. CFG_TCV_TrickleCharge is a target charge voltage to be used in a trickle charge mode. Each target charge voltage is preconfigured for each particular vehicle model based on the specifications of the electrical system and desired performance.

A variable named CFG_VTargetOffset is a voltage target offset that is configured for a particular vehicle model to identify and compensate for resistance in the wires between the charging source and the battery so that an accurate charging voltage may be delivered to the battery.

FIG. 2 shows two outputs from VPMS controller block 24. The first output is called PMS_SOH_output which is a state of health flag from the vehicle power management system indicating whether the battery state of health exceeds a critical value. Below the critical value, a battery warning should be issued to the driver of the vehicle. The second output is a PMS_TCVout which is a compensated target charge voltage calculated in a manner described below.

Figure 3:
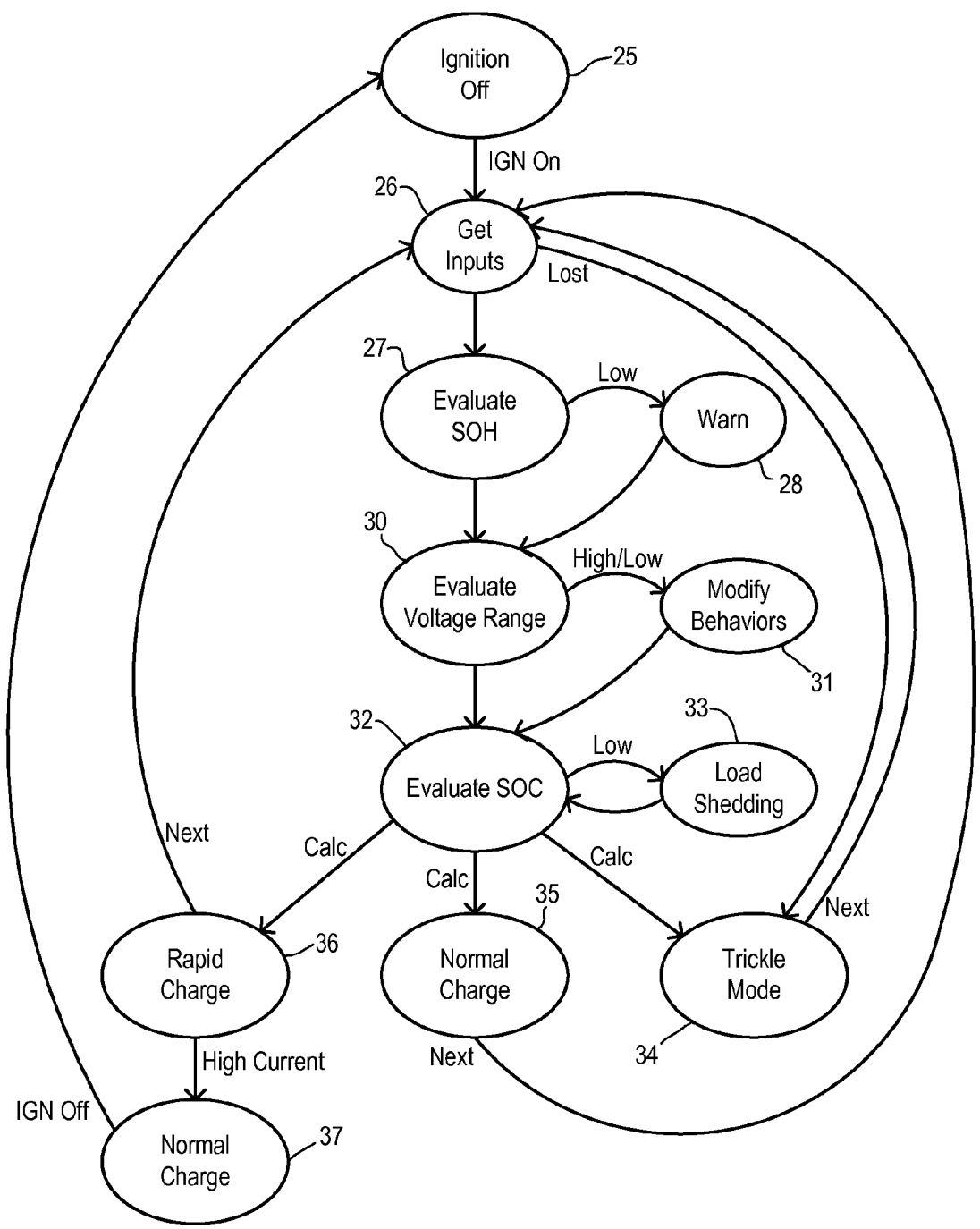
FIG. 3 is a state diagram illustrating the charging modes in one embodiment of the present invention.

The VPMS controller of the present invention preferably operates according to a state diagram shown in FIG. 3. An initial state 25 corresponds to the ignition of the vehicle being in an off condition as indicated by the VSC_KeyStat signal. When the ignition turns on (as indicated by VSC_KeyStat transitioning to an ignition on condition), the VPMS controller transitions to a state 26 wherein various inputs are gathered via messages from other modules such as a battery monitor module or a PCM module. If communication is lost and the desired input signals or messages over the vehicle bus are not obtained in state 26, then a transition is made to a trickle charge mode 34, wherein only a small amount of battery charging is obtained as will be described below.

If all input values are obtained in state 26, then a transition is made to a state 27 for evaluating the state of health (SOH) of the battery. If a low SOH is detected, then a transition is made to a state 28 wherein a warning signal is issued to the driver, such as the lighting of an indicator light or the display of a warning message on the instrument panel of the vehicle.

After issuing the warning in state 28 or if the SOH is not low in state 27, then a transition is made to a state 30 for evaluating a voltage range of the vehicle electrical system. Thus, the battery monitor may provide a system voltage measurement to the VPMS controller which compares the system voltage to a high voltage threshold and a low voltage threshold to detect when the system voltage is undesirably high or low. When such high or low system voltage is detected, a transition is made to a state 31 wherein certain behaviors of the electrical system are modified as will be explained below in connection with FIG. 4.

From states 30 or 31, a transition is made to a state 32 for evaluating the SOC of the battery as compared to the minimum and maximum SOC thresholds. Optionally, state 32 may also transition to a load shedding state 33 when the SOC value is below a corresponding threshold. State 32 determines which charge mode should be utilized based on the SOC and calculates a target charge voltage to the selected charge mode. More specifically, the VPMS controller enters a rapid charge mode when the SOC is less than the minimum threshold. The VPMS controller enters a normal charge mode when the SOC is greater than the minimum threshold and less than the maximum threshold. The VPMS controller enters a trickle charge mode when the SOC is greater than the maximum threshold. In each mode, the VPMS controller selects a corresponding target charge voltage, compensates the target charge voltage for battery temperature and wiring resistance, and transmits the compensated target charge voltage to the charging source. After entering any particular charge mode, the VPMS controller waits for a predetermined time (e.g., about 20 milliseconds) and then returns to state 26 to get a next set of inputs and then evaluate them in the same manner.

While in rapid charge mode 36, the VPMS controller also checks for an excessive charging current to the battery (i.e., greater than CFG_ChrgCurrent_THR), and when a high current is detected then a transition is made to a normal charge state 37 which sets the target charge voltage using CFG_TCV_NormalCharge (compensated for battery temperature and wire resistance). The VPMS controller stays in normal charge state 37 until the ignition is turned off, so that fuel efficiency is not negatively impacted by excessive charging at the rapid charge target voltage.

The trickle charge mode will now be considered in more detail. When state 32 evaluates the state of charge and finds that PMS_StateOfCharge is greater than or equal to CFG_PMS_SOC_MAX_THR then it transitions to state 34 for the trickle charge mode. Target charge voltage PMS_TCVout is calculated according to the following formula:

$$TCV + Temp(°C.) \times \left(-0.03 \frac{V}{°C.}\right) + V_{Offset}$$

wherein TCV is the target charge voltage (which in the trickle charge mode is assigned the predetermined value of CFG_TCV_TrickleCharge), Temp is assigned the value of BMS_Btemp, and $V_{Offset}$ is assigned the value of CFG_VTargetOffset.

When state 32 determines that PMS_StateOfCharge falls between CFG_PMS_SOC_MIN_THR and CFG_PMS_SOC_MAX_THR, then it enters state 35 for the normal charge mode. The target voltage PMS_TCVout is calculated using the same battery temperature compensation and configurable offset for compensating for wire resistance, but assigning the predetermined value of CFG_TCV_NormalCharge for TCV in the above formula. The target charge voltage in the normal charge mode is larger than the target voltage in the trickle charge mode.

When state 32 determines that PMS_StateOfCharge is less than CVG_PMS_SOC_MIN_THR, then it transitions to a state 36 for a rapid charge mode which provides an even higher target charge voltage in order to rapidly charge the battery. Calculation of PMS_TCVout uses the predetermined value of CFG_TCV_RapidCharge for TCV in the above formula. During successive evaluations of the inputs, the rapid charge mode can be maintained for as long as PMS_StateOfCharge remains below the minimum threshold without the charge current exceeding the charge current threshold. Otherwise, charging is performed at the normal target voltage during the remainder of the particular drive cycle of the vehicle.

Figure 4:
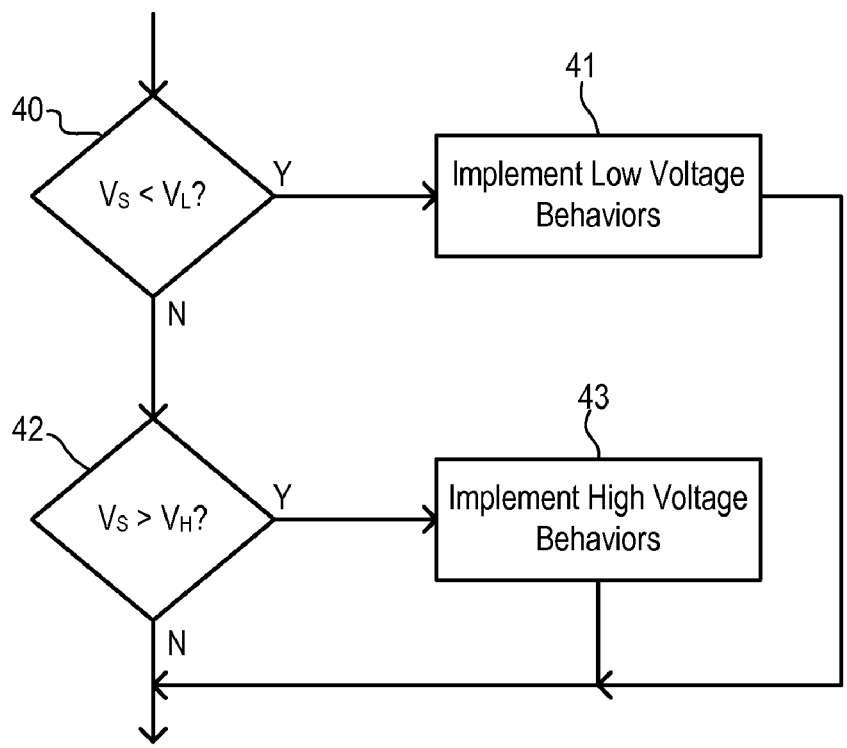
FIG. 4 is a flowchart showing an optional enhancement of the invention.

The optional feature of voltage range monitoring will be discussed in greater detail in connection with FIG. 4. A system voltage $V_S$ as determined by the battery monitor and or charger/generator system is compared to a low voltage threshold $V_L$ in step 40. If system voltage is below the threshold then low voltage behaviors are implemented in step 41. Preferably, the system voltage may be sampled at predetermined intervals such as about 20 ms. In order to implement low voltage behaviors, the system voltage must preferably be below the threshold for at least 500 ms (i.e., 25 consecutive samples). When a low system voltage is detected in this manner, the VPMS controller sets a fault condition and notifies other modules in the electrical system. It may command other modules to reduce or eliminate power consumed by predetermined loads. The low voltage behaviors may further include any of several possible actions including 1) a prohibition against setting faults in the other modules, 2) a prohibition against performing diagnostics on particular system outputs, 3) setting the climate control system to ignore remote cabin conditioning requests, 4) preventing the functioning of Xenon headlamps, 5) operating other exterior lights with reduced light output, 6) inhibiting electrical components requiring relay control such as windshield wipers (although relays already turned on prior to the voltage classification becoming low may still remain on), 7) windshield wipers may function at a reduced speed, and 8) RKE functionality may be inhibited.

If a low system voltage is not detected in step 40, then a check is made in step 42 to determine whether system voltage $V_S$ is greater than a high voltage threshold $V_H$. If so then high voltage behaviors may be implemented in step 43. The high voltage behaviors may include 1) no faults shall be set in other modules, 2) no diagnostics are performed on electrical outputs, 3) remote cabin conditioning requests are ignored, 4) Xenon headlamps do not function, 5) other exterior lights function with increased light output, 6) windshield wipers function at an increased speed, and 7) RKE functionality shall not occur.

In order to detect a change back to a normal voltage range, the system voltage must preferably remain between the low and high thresholds for at least 500 ms (25 consecutive samples).

Figure 5:
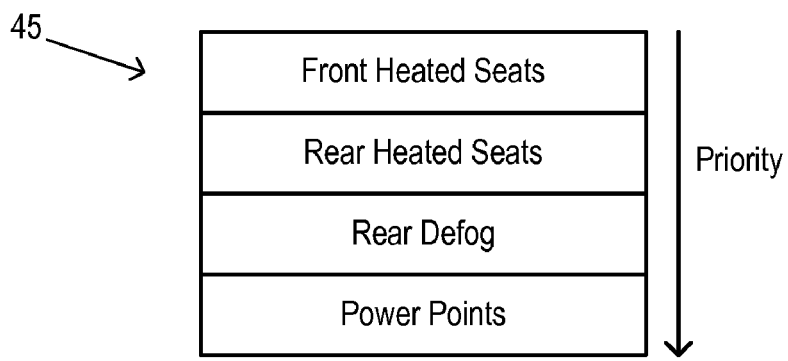
FIG. 5 is a diagram showing priorities of loads in a load shedding enhancement.

The optional function of load shedding when the state of charge of the battery is depleted to a point that both recharging and operation of all loads cannot be supported will now be discussed in greater detail. When PMS_StateOfCharge is less than a configurable threshold designated CFG_SOC_LoadShedMin, then the VPMS controller initiates a load shed strategy. The load shed strategy is terminated when the state of charge rises above a higher threshold designated CFG_SOC_LoadShedRtn. The values of these thresholds are specifically designed for each particular vehicle. Once any load is shed it does not turn back on until it is commanded back on by manual user interaction. Only noncritical convenience loads may be deactivated during a load shed operation. FIG. 5 shows selected loads that may be deactivated according to a preferred priority of being deactivated. Thus, front heated seats may have a lowest priority and are deactivated first. The longer that the state of charge remains below the load shed return threshold, the more loads will be shed. Thus, if the load shed condition continues then rear heated seats, rear defogger, and power points may be successively deactivated.

The present invention may also utilize a battery saver feature to shut off certain outputs automatically after a predetermined period of time after turning off of the vehicle ignition. For example, parking lamps, head lamps, and rear fog lamp may be deactivated twenty minutes after turning off of the ignition. Courtesy lights, ambient lights, demand lights, and display backlighting may also be deactivated at that same time if they were left on. Preferably, hazard lights would not be controlled or affected by the battery saver feature. Once particular features are shut off by the battery saver feature they will remain off until commanded back on by manual user interaction. The VPMS controller may have a shipping mode in which the battery saver time is reduced to one minute. The shipping mode would be activated at the factory and then deactivated at the dealership before a vehicle is delivered to the end customer.

What is claimed is:

1. A vehicle power management system (VPMS) for controlling a charging voltage of a battery in a vehicle, wherein the vehicle includes a charging source that provides a selected voltage to the battery, the system comprising:

a battery monitor coupled to the battery for determining a state of charge (SOC) of the battery, a battery temperature, and a battery charging current; and a VPMS controller receiving periodic messages from the battery monitor including measurement results of the SOC, battery temperature, and battery charging current from the battery monitor, wherein the VPMS controller evaluates the messages from the battery monitor to determine a charge mode;

wherein the VPMS controller enters a rapid charge mode when the SOC is less than a first threshold, wherein the VPMS controller selects a target rapid charge voltage, compensates the target rapid charge voltage for the battery temperature, and transmits the compensated rapid charge voltage to the charging source, and wherein the VPMS controller compares the battery charging current to an overcurrent threshold and if the battery charging current exceeds the overcurrent threshold then the VPMS controller transmits a reduced charge voltage to the charging source;

wherein the VPMS controller enters a normal charge mode when the SOC is greater than the first threshold and less than a second threshold, wherein the VPMS controller selects a target normal charge voltage which is less than the target rapid charge voltage, compensates the target normal charge voltage for the battery temperature, and transmits the compensated normal charge voltage to the charging source;

wherein the VPMS controller enters a trickle charge mode when the SOC is greater than the second threshold, wherein the VPMS controller selects a target trickle charge voltage which is less than the target normal charge voltage, compensates the target trickle charge voltage for the battery temperature, and transmits the compensated trickle charge voltage to the charging source;

wherein the VPMS controller enters the trickle charge mode in the event of a failure to receive the SOC, battery temperature, or battery charging current from the battery monitor.

2. The system of claim 1 wherein the VPMS controller determines compensated voltages in accordance with:

$$TCV + Temp(^\circ C.) \times \left(-0.03 \frac{V}{^\circ C.}\right) + V_{Offset},$$

wherein TCV is the target rapid charge voltage, target normal charge voltage, or target trickle charge voltage, respectively, and $V_{Offset}$ has a predetermined value that compensates for resistance between the battery and charging source which is characteristic of the vehicle.

3. The system of claim 1 wherein the reduced charge voltage is equal to the compensated normal charge voltage, and wherein the reduced charge voltage is maintained for as long as a vehicle ignition is not turned off.

4. The system of claim 1 wherein the battery monitor determines a state of health (SOH) of the battery, and wherein the VPMS controller compares the SOH to an SOH threshold, and if the SOH is less than the SOH threshold then the VPMS controller generates a driver alert.

5. The system of claim 1 wherein the battery monitor determines a system voltage available to electrical loads within the vehicle, wherein the VPMS controller classifies the system voltage as Low, Normal, or High in response to the predetermined thresholds, and wherein the VPMS controller transmits a command to at least some electrical loads in response to a Low or High classification in order to modify behavior of the corresponding electrical loads.

6. The system of claim 5 wherein modified behavior during a Low classification is comprised of inhibiting the setting of faults, discontinuance of diagnostic routines, and reducing or eliminating power consumed by predetermined loads.

7. The system of claim 5 wherein modified behavior during a High classification is comprised of inhibiting the setting of faults, discontinuance of diagnostic routines, and deactivating predetermined loads.

8. The system of claim 1 wherein the VPMS controller compares the SOC to a load shed threshold, and enters a load shed mode if the SOC is less than the load shed threshold, wherein the load shed mode comprises:

deactivating at least one load having a first priority, wherein a deactivated load is only reactivated in response to a manual action;

comparing the SOC to a load return threshold; and exiting the load shed mode if the SOC is greater than the load return threshold, otherwise deactivating at least one load having a second priority higher than the first priority.

9. A method of controlling a charging voltage of a battery in a vehicle, wherein the vehicle includes a charging source that provides a selected voltage to the battery, the method comprising the steps of:

periodically determining a state of charge (SOC) of the battery, a battery temperature, and a battery charging current by a battery monitor;

comparing the SOC with a first threshold and a second threshold, wherein the second threshold is greater than the first threshold;

entering a rapid charge mode when the SOC is less than the first threshold, wherein the rapid charge mode includes selecting a target rapid charge voltage, compensating the target rapid charge voltage for the battery temperature, and transmitting the compensated rapid charge voltage to the charging source, and wherein the rapid charge mode includes comparing the battery charging current to an overcurrent threshold and if the battery charging current exceeds the overcurrent threshold then transmitting a reduced charge voltage to the charging source;

entering a normal charge mode when the SOC is greater than the first threshold and less than the second threshold, wherein the normal charge mode includes selecting a target normal charge voltage which is less than the target rapid charge voltage, compensating the target normal charge voltage for the battery temperature, and transmitting the compensated normal charge voltage to the charging source;

entering a trickle charge mode when the SOC is greater than the second threshold, wherein the trickle charge mode includes selecting a target trickle charge voltage which is less than the target normal charge voltage, compensating the target trickle charge voltage for the battery temperature, and transmitting the compensated trickle charge voltage to the charging source; and entering the trickle charge mode in the event of a failure to determine the SOC, battery temperature, or battery charging current.

10. The method of claim 9 wherein the compensated voltages are determined in accordance with:

$$TCV + Temp(^\circ C.) \times \left(-0.03 \frac{V}{^\circ C.}\right) + V_{Offset},$$

wherein TCV is the target rapid charge voltage, target normal charge voltage, or target trickle charge voltage, respectively, and $V_{Offset}$, has a predetermined value that compensates for resistance between the battery and charging source which is characteristic of the vehicle.

11. The method of claim 9 wherein the reduced charge voltage is equal to the compensated normal charge voltage, and wherein the reduced charge voltage is maintained for as long as a vehicle ignition is not turned off.

12. The method of claim 9 further comprising the steps of:
determining a state of health (SOH) of the battery;
comparing the SOH to an SOH threshold; and
if the SOH is less than the SOH threshold then generating a driver alert.

13. The method of claim 9 further comprising the steps of:
determining a system voltage available to electrical loads within the vehicle;
classifying the system voltage as Low, Normal, or High in response to the first and second thresholds; and
transmitting a command to at least some electrical loads in response to a Low or High classification in order to modify behavior of the corresponding electrical loads.

14. The method of claim 13 wherein modified behavior during a Low classification is comprised of inhibiting the setting of faults, discontinuance of diagnostic routines, and reducing or eliminating power consumed by predetermined loads.

15. The method of claim 13 wherein modified behavior during a High classification is comprised of inhibiting the setting of faults, discontinuance of diagnostic routines, and deactivating predetermined loads.

16. The method of claim 9 further comprising the steps of:
comparing the SOC to a load shed threshold; and
entering a load shed mode if the SOC is less than the load shed threshold, wherein the load shed mode comprises:
deactivating at least one load having a first priority, wherein a deactivated load is only reactivated in response to a manual action;
comparing the SOC to a load return threshold; and
exiting the load shed mode if the SOC is greater than the load return threshold, otherwise deactivating at least one load having a second priority higher than the first priority.

* * * * *